United States Patent [19]
Oehmichen

[11] Patent Number: 4,942,684
[45] Date of Patent: Jul. 24, 1990

[54] SLIDE MOUNT FOR PERFORATED FILMS

[76] Inventor: Eckhardt Oehmichen, Mannspergerstrasse 96, D-7000 Stuttgart 75, Fed. Rep. of Germany

[21] Appl. No.: 229,232

[22] Filed: Aug. 8, 1988

[30] Foreign Application Priority Data

Aug. 6, 1987 [DE] Fed. Rep. of Germany ....... 3726157

[51] Int. Cl.$^5$ ........................... A47G 1/06; G09F 1/12
[52] U.S. Cl. ....................................... 40/152; 40/159.2
[58] Field of Search ...................... 40/152, 158.1, 159.2

[56] References Cited

U.S. PATENT DOCUMENTS 2,292,312  8/1942  Wittel et al. ........................... 40/152
4,104,818  8/1978  Hrabik ................................... 40/152

FOREIGN PATENT DOCUMENTS 3041868  11/1981  Fed. Rep. of Germany .
2648703   4/1982  Fed. Rep. of Germany .
  64787  12/1955  France ................................... 40/152

OTHER PUBLICATIONS

DIN 4536, "Film No. 135 (35 mm) for Magazine; Dimensions, Edge Marking"; May 1977.

Primary Examiner—Richard J. Apley
Assistant Examiner—D. F. Crosby
Attorney, Agent, or Firm—Christie, Parker & Hale

[57] ABSTRACT

A slide mount includes a readily removable strip of bosses for engaging the perforations at one edge of the film which can be fitted in at least two different positions in one or more grooves, including at least one position where the distance between the longitudinal centerline of the window to the centerline of the bosses on the boss strip differs by a predetermined displacement from the nominal distance from the perforations on the film to the longitudinal centerline of the film. Each window is preferably provided with two grooves, one above and one below the window opening; the centerline of the bosses is preferably offset from the centerline of the boss strip by a fixed amount. By selectively placing the single boss strip in either of two orientations in either of the two grooves, the vertical position of the film may be displaced by different amounts. In a stereo version of the mount having two windows, one for each film image, each window has its own associated boss strip and the vertical position of each of the two individual film images is thereby individually positionable with respect to its window.

11 Claims, 1 Drawing Sheet

SLIDE MOUNT FOR PERFORATED FILMS

TECHNICAL FIELD

The present invention relates to a slide mount for holding one or more individual frames of edge-perforated film.

CLAIM FOR PRIORITY

This application is based on and claims priority from an application first filed in the Federal Republic of Germany on Aug. 6, 1987 under Ser. No. P 37 26 157.6. To the extent such prior application may contain any additional information that might be of any assistance in the use and understanding of the invention claimed herein, it is hereby incorporated by reference.

BACKGROUND ART

A representative edge perforated photographic film is disclosed in standards DIN 4536 and ISO 1007. In prior art slide mounts such as disclosed in German patent publications No. DE 26 48 703 C2 and No. DE 30 41 868 A1, the film is stretched in the interest of providing perfect projection. These prior art slide mounts comprise four parts, namely molded front and back frame parts and upper and lower boss strips located in grooves formed in the frame parts, the two strips of bosses being spaced apart and engaging the perforations at either edge of the film to thereby maintain the film in the desired stretched configuration.

DISCLOSURE OF INVENTION

It is an overall object of the present invention to provide a simple form of slide mount which makes it possible to adjust the film's longitudinal centerline with respect to the image window.

It is a more specific such object to provide a stereo slide mount having two side-by-side windows, one for each of two individual frames of film, each provided with means for adjusting the vertical position of its associated frame of film relative to the mount.

The present invention is predicated on the recognition that under certain conditions, it is not necessary to stretch the film and thus only a single boss strip at only one edge of the film need be provided.

In accordance with the invention, the above-mentioned objects are achieved by a slide mount in which a readily removable strip of bosses for engaging the perforations at one edge of the film can be fitted in at least two different positions in one or more grooves, including at least one position where the distance between the longitudinal centerline of the window to the centerline of the bosses on the boss strip differs by a predetermined displacement from the nominal distance (a) from the perforations on the film to the longitudinal centerline of the film. Each window is preferably provided with two grooves, one above and one below the window opening, with each such groove displaced from the nominal location of the perforations by a same or different amount (y, Y'); the centerline of the bosses is preferably offset from the centerline of the boss strip by a fixed amount (x).

By selectively placing the single boss strip in either of two orientations (offset up or offset down) in either of the two grooves (upper groove or lower groove), the vertical position of the film may be displaced by four different amounts from its nominal position in the mount (y+x; y−x; −y'+x; −y'−x).

In a stereo version of the mount having two windows, one for each film image, each window has its own associated boss strip and the vertical position of each of the two individual film images is thereby individually positionable with respect to its window.

BRIEF DESCRIPTION OF DRAWINGS

The invention will now be explained in greater detail and by way of example with reference to the accompanying drawing, in which.

BEST MODE FOR CARRYING OUT THE INVENTION

Figure 1:
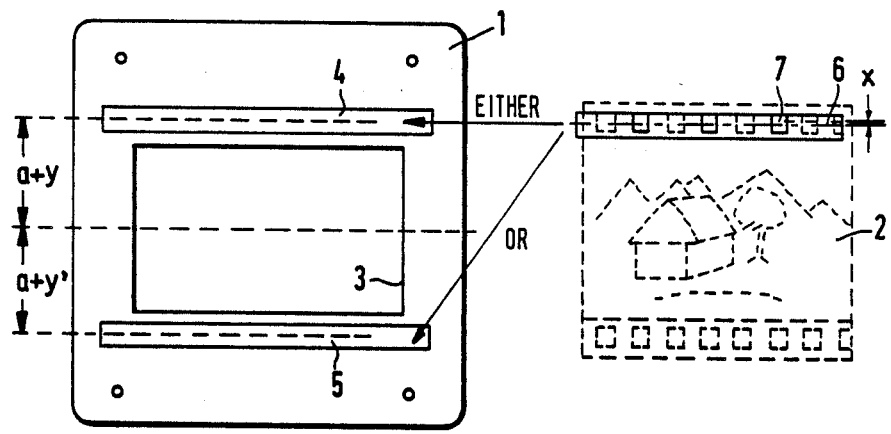
FIG. 1 shows one of the two like frame parts of the slide mount and the single boss strip used therewith.

The slide mount of FIG. 1 consists of two complementary plastic frame parts 1, of which one is shown. The two opposing frame parts, when pressed together, clamp an edge-perforated piece of image bearing slide film 2 between them, with an image showing through a window 3, which is somewhat smaller than the image-bearing portion of the film 2. Upper and lower grooves 4, 5 are molded in the frame part 1 adjacent respectively the two horizontal (long) edges of the window.

Associated with the slide mount is a single boss strip 6, which has approximately rectangular bosses 7 separated by twice the spacing of the holes of the film perforation. The bosses are so designed that the perforations of the slide film 2 can be pressed onto the bosses. This is achieved by conical bosses 7 or in any other suitable manner. Preferably, the boss strip 6 fits somewhat loosely in either of the grooves 4, 5 and has beveled ends to facilitate removal therefrom.

In the case of slide mounts for normal projection, but more particulary in the case of slide mounts intended for lapdissolve and stereo projection, it is essential that the portion of the image showing through the window can be adjusted in the vertical direction, to achieve proper registration between related images. In the present invention, this is made possible by securing the slide film at one edge only to a single boss strip, in a design whereby the boss strip may be fixed in several positions, including at least one position in which the bosses are at a distance from the longitudinal centerline of the slide mount different from the corresponding nominal standardized distance for the perforations in the particular film being used. The standard distance referred to here is designated a in the figures and corresponds to ½ (f+b) in DIN 4536 (wherein f is the nominal distance between the respective inner edges of the perforations and b is the nominal distance between the outer edge of the perforations and the outer edge of the film. To provide the required deviation from that standard distance, at least the distance of one of the grooves 4, 5 from the longitudinal centerline of the slide mount is different from that standard distance, and/or the bosses 7 are offset with respect to the longitudinal centerline of the boss strip 6.

The offset of the bosses 7 with respect to the longitudinal centerline of the boss strip 6 is designated x and is readily apparent from FIG. 1. It is also possible that there may be a zero offset of the bosses (ie, they are symmetrically arranged about the longitudinal axis of the boss strip), but this will result in fewer adjustment possibilities. In FIG. 1, the distances between the longitudinal centerlines of the grooves and the longitudinal centerline of the frame part are designated a+y, a+y'; this is to indicate that these distances are not necessarily equal. It should also be understood that the distance from one or both grooves to the centerline of the mount could be less than the nominal distance, in which y and/or y' would be negative.

To mount a slide film 2, the boss strip 6 is first inserted into the upper groove 4, for example, with the bosses 7 in the position shown (ie, offset upwards). Then the slide film 2 is pressed onto the bosses 7. The frame part 1 is then inserted into a viewing device, so that the vertical and lateral displacements of the image in relation to the window may be observed more accurately. To change the vertical position of the image relative to the window, there are three alternatives (in each, the film 2 is removed from the boss strip 6 and then clamped on it in a different position):

- removing the boss strip and turning it through 180°, so that after reinsertion, the bosses are closer to the longitudinal centerline of the slide (ie, offset downwards);
- inserting the boss strip into the lower groove so that the bosses point upwards, or
- inserting the boss strip into the lower groove so that the bosses point downwards.

Example:

If, in FIG. 1, both distances a+y, a+y' are 0.2 mm greater than the standard distance and a boss strip with symmetrically arranged bosses 7 is used, the vertical displacement of the image in relation to the window can be either or 0.2 mm upwards of 0.2 mm downwards. If, however, a boss strip is used in which the offset of the bosses 7 is 0.1 mm, there are four possibilities of the vertical displacement of the image:

| | |
|---|---|
| 0.3 mm upwards | boss strip in the upper groove with bosses pointing upwards; |
| 0.1 mm upwards | boss strip in the upper groove with bosses pointing downwards; |
| 0.1 mm downwards | boss strip in the lower groove with bosses pointing upwards; |
| 0.3 mm downwards | boss strip in the lower groove with bosses pointing downwards. |

For lateral adjustment, the boss strip may be slid lengthwise, as in the prior art slide mounts.

Figure 2:
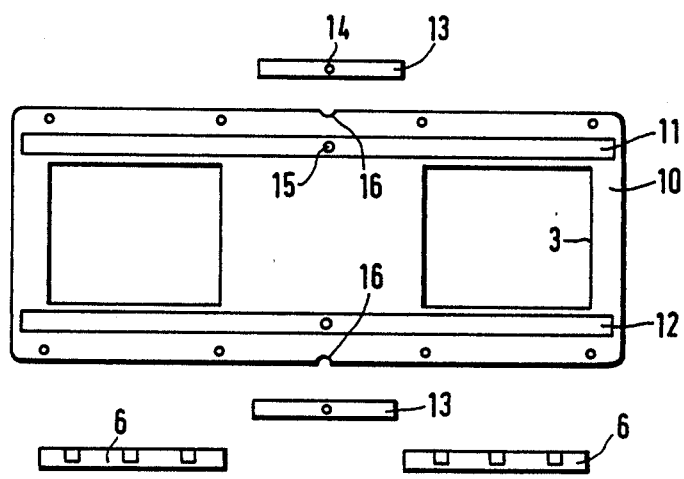
FIG. 2 shows one of the two like frame parts of the stereo slide mount and the two boss strips used therewith.

FIG. 2 shows a frame part 10 of a stereo slide mount which effectively integrates two slide mounts as shown in FIG. 1. The two boss strips 6 necessary for this frame part 10 are shown below the latter. In the embodiment shown, continuous grooves 11 and 12 are provided. The boss strips 6 are inserted into one or both of the grooves 11, 12 as described in connection with the grooves 4, 5 of FIG. 1.

In the stereo embodiment of FIG. 2, distance pieces 13 may also be provided which have holes 14, so that they can be slipped over pins 15 in the grooves. The holes and the pins are each located in the middle of the grooves, between the two windows. The distance pieces 13 provide a means to constrain the horizontal position of the two boss strips and thus of the two images. The length of the distance pieces depends on the film transport step of the camera used and the length of the boss strips. If a lateral displacement of one or both images of the stereo slide is desired, this may be done manually by sliding each boss strip 6 the desired amount in its associated groove 10, 11. Alternatively, use may be made of a simple adjusting tool (not shown) which engages the two depressions 16 and which operates on one or both of the two boss strips 6 (or on the distance pieces 13) to alter the horizontal distance between the two images and/or to shift laterally the two images in the same direction.

The present invention has been described above with regard to certain presently contemplated specific embodiments of the invention. It will be appreciated to those skilled in the art that modifications and variations thereof are possible within the spirit and scope of the appended claims.

What is claimed is:

1. A slide mount for a single frame of film having two sets of edge perforations whose respective centers are at a nominal distance from the longitudinal centerline of the film, said mount comprising two complementary plastic frame parts, each defining a rectangular window centered about a longitudinal centerline of the slide mount, said frame parts being adapted to be closed together to clamp the film between said two frame parts to thereby define a mounting frame having one or more longitudinally-oriented grooves adjacent one or more opposing longitudinally extending edges of the window, and a single boss strip which is removably insertable into said one or more grooves in at least two alternative predetermined positions relative to said mounting frame, said single boss strip having a plurality of bosses for securing the film thereon via the perforations at one edge thereof, wherein in at least one of said two alternative positions, the distance of the bosses from the longitudinal centerline of the window is different than said nominal distance, and wherein when said single boss strip assumes different ones of said two alternative positions and is secured to a corresponding one of said two sets of edge perforations, the single boss strip locates the longitudinal centerline of the film in respective different predetermined vertical positions relative to the longitudinal centerline of the window.

2. A slide mount for a single frame of film having edge perforations whose centers are at a nominal distance from the longitudinal centerline of the film, said mount comprising two complementary plastic frame parts, each defining a rectangular window centered about a longitudinal centerline of the slide mount, said frame parts being adapted to be closed together to thereby define a mounting frame which clamps the film between said two frame parts, said mounting frame being provided with two similarly-dimensioned longitudinally-oriented grooves parallel to the two opposing edges of the window, and a boss strip removably insertable into either of said grooves to thereby define at least two alternative positions of the boss strip relative to the mounting frame, said boss strip having a plurality of bosses for securing the film thereon via the perforations at a corresponding edge thereof, wherein in at least one of said alternative positions, the distance of the centerline of the corresponding one of the two grooves from the longitudinal centerline of the slide mount as well as the corresponding distance of the bosses from that longitudinal centerline is different from said nominal distance.

3. A slide mount as claimed in claim 2, wherein the distances from the centerline of each of the grooves to the longitudinal centerline of the slide mount differs from said nominal distance by 0.1 mm to 0.7 mm.

4. A slide mount as claimed in claim 11, wherein the offset of the bosses is 0.1 mm to 0.7 mm.

5. A slide mount as claimed in claim 4 wherein at least two said longitudinally-oriented grooves are provided at respective upper and lower edges of the window and the respective distances from the centerlines of the two grooves to the longitudinal centerline of the slide mount are equal to one another and differ from said nominal distance by an amount different from the offset of the bosses.

6. A stereo slide mount for a pair of image bearing individual frames of edge-perforated film, said mount comprising two complementary plastic frame parts, each having two laterally displaced rectangular windows, which can be closed together to form a mount for clamping the pair of frames of perforated film between said two frame parts, upper and lower similarly-dimensioned longitudinally-oriented grooves being provided in said mount, adjacent respective upper and lower edges of the windows, and a pair of substantially identical boss strips each insertable into either of the grooves adjacent a respective one of the windows in at least two alternative predetermined positions relative to its said respective window, and each having a plurality of bosses for clamping a respective film image thereon via the perforations at one edge thereof, wherein in at least one of the alternative positions in which a given one of the boss strips can be inserted into at least one of said grooves, the vertical distance of the bosses from the horizontal centerline of the slide mount is different than the nominal distance of the perforations from the longitudinal centerline of the film, and wherein, when each of said boss strips is inserted into a different one of said alternative predetermined positions, the respective longitudinal centerlines of the respective frames of film clamped thereon assume different predetermined vertical positions relative to the longitudinal centerline of the mount.

7. A stereo slide mount as claimed in claim 6, wherein each of said grooves extends continuously from a position adjacent one of the windows to a position adjacent the other window.

8. A stereo slide mount as claimed in claim 7, further comprising a distance piece respectively insertable into the middle portion of one of said continuously extending grooves for determining the lateral position of one of said film images.

9. A stereo slide mount as claimed in claim 8, wherein the distance piece is removably fixed in the middle of the groove.

10. A stereo slide mount claimed in claim 7, wherein at least one recess is provided between the two windows for inserting an adjusting aid.

11. A slide mount for a single frame of film having edge perforations whose centers are at a nominal distance from the longitudinal centerline of the film, said mount comprising two complementary plastic frame parts, each defining a rectangular window centered about a longitudinal centerline of the slide mount, said frame parts being adapted to be closed together to thereby define a mounting frame which clamps the film between said two frame parts, said mounting frame being provided with at least one longitudinally-oriented groove parallel to the two opposing longitudinal edges of the window, and a boss strip removably insertable into said at least one groove in at least two alternative positions of the boss strip relative to said mounting frame, said boss strip having a plurality of bosses for securing the film thereon via the perforations at one edge thereof, wherein the bosses on the boss strip are offset with respect to the longitudinal centerline of the boss strip and, in at least one of said alternative positions, the distance of the bosses from the longitudinal centerline of the window is different than said nominal distance.

* * * * *